United States Patent
Beakes et al.

(10) Patent No.: US 6,267,317 B1
(45) Date of Patent: Jul. 31, 2001

(54) STATOR WINDING METHOD AND APPARATUS

(75) Inventors: John M. Beakes, Fairborn; Gary E. Clemenz, Bellbrook; Patrick A. Dolgas, Milford; Mark E. Heaton, Springfield; Lawrence E. Newman, Tipp City, all of OH (US)

(73) Assignee: Globe Products Inc., Huber Heights, OH (US)

( * ) Notice: Subject to any disclaimer, the term of this patent is extended or adjusted under 35 U.S.C. 154(b) by 0 days.

(21) Appl. No.: 08/456,093

(22) Filed: May 31, 1995

Related U.S. Application Data

(60) Continuation of application No. 08/349,410, filed on Dec. 5, 1994, now Pat. No. 5,549,253, which is a division of application No. 08/148,175, filed on Nov. 5, 1993, now Pat. No. 5,370,324, which is a continuation of application No. 07/587,937, filed on Sep. 25, 1990, now abandoned.

(51) Int. Cl.[7] .................................................. H02K 15/085
(52) U.S. Cl. ................................... 242/432.4; 242/432.6; 29/596; 29/605
(58) Field of Search ............................. 242/1.1 R, 1.1 A, 242/1.1 E; 29/596, 605

(56) References Cited

U.S. PATENT DOCUMENTS

| | | | |
|---|---|---|---|
| 3,580,090 | 5/1971 | Bondarenko | 242/1.1 R |
| 3,648,938 | 3/1972 | Dryburgh . | |
| 3,812,570 | 5/1974 | Mason | 29/205 D |
| 3,881,238 | 5/1975 | Mason | 29/205 D |
| 3,903,593 | 9/1975 | Mason | 242/1.1 R |
| 4,000,764 | 1/1977 | Reiger, Jr. | 140/113 |
| 4,074,418 | 2/1978 | Pearsall | 29/596 |
| 4,158,314 | 6/1979 | Finegold | 74/23 |

(List continued on next page.)

FOREIGN PATENT DOCUMENTS

| | | |
|---|---|---|
| 0331906 | 2/1989 | (EP) . |
| 91308740 | 6/1993 | (EP) . |

OTHER PUBLICATIONS

Affidavit by Axis S.p.A. Employee Regarding Video Recording Alleged by Axis S.p.A. to Show Prior Art Machine.
Video Recording Alleged by Axis S.p.A., Florence, Italy, to have been made Available to Customers in 1986 and Showing a Machine Alleged to have been Sold in 1986.
Front & Rear Covers, Title Page, pp. 22–24, and a Company Adress Page of Brochure Titled "Our World Revolves Round Electricity" Published by Micafil AG, 1986.
Page from Brochure Titled "Globe Automated Stator Assembly" Showing HSWTC—3100 Published 1986 by Statomat–Globe, Inc., Front and Back Cover Pages included.
Two Photographs of Prior Art Machine.
The Globe Tool and Engineering Company Drawing No. E-X69039 Dated Feb. 26, 1984 Showing Prior Art Machine.
Brochure "Globe MDF 6000" Published 1985 by The Globe Tool and Engineering Co., Dayton, OH.

Primary Examiner—Katherine A. Matecki
(74) Attorney, Agent, or Firm—Roger S. Dybvig

(57) ABSTRACT

A stator winding machine has a turret plate mounted for rotation about a vertical axis with stator clamp mechanisms mounted at spaced locations around its periphery for clamping stators to the turret plate with the axes of the stators coplanar with the axis of reciprocation and oscillation of the winding shuttle used to wind coils on the stators. The turret plate is repeatedly indexed in one direction about its vertical center axis to repeatedly sequentially move each of the stator clamp mechanism to a load/unload station, an optional idle station, a winding station, a coil lead terminating station, and then back to the load/unload station. Parts of the machine are quickly replaceable and other parts are programmably adjustable to accommodate different stator configurations.

33 Claims, 7 Drawing Sheets

U.S. PATENT DOCUMENTS

| | | | |
|---|---|---|---|
| 4,483,433 | 11/1984 | Fischer et al. | 198/339 |
| 4,553,319 | 11/1985 | Fischer et al. | 29/596 |
| 4,679,312 | 7/1987 | Nussbaumer et al. | 29/596 |
| 4,732,338 | 3/1988 | Eminger et al. | 242/1.1 R |
| 4,762,283 | 8/1988 | Sabatino | 242/1.1 R |
| 4,844,356 | 7/1989 | Koizumi | 242/1.1 R |
| 4,913,362 | 4/1990 | Koizumi | 242/1.1 R |
| 4,946,111 | 8/1990 | Luciani . | |
| 4,951,379 | 8/1990 | Clement | 29/597 |
| 4,969,606 | 11/1990 | Santandrea et al. | 242/1.1 R |
| 4,982,908 | 1/1991 | Luciani | 242/1.1 R |
| 4,997,138 | 3/1991 | Luciani et al. | 242/7.03 |
| 5,149,000 | 9/1992 | Santandrea et al. . | |
| 5,207,745 | 5/1993 | Santandrea | 242/1.1 R |
| 5,316,228 | 5/1994 | Santandrea et al. . | |
| 5,370,324 | 12/1994 | Beakes et al. | 242/1.1 R |
| 5,372,319 | 12/1994 | Dalgas | 242/7.05 B |
| 5,383,618 | 1/1995 | Santandrea et al. . | |

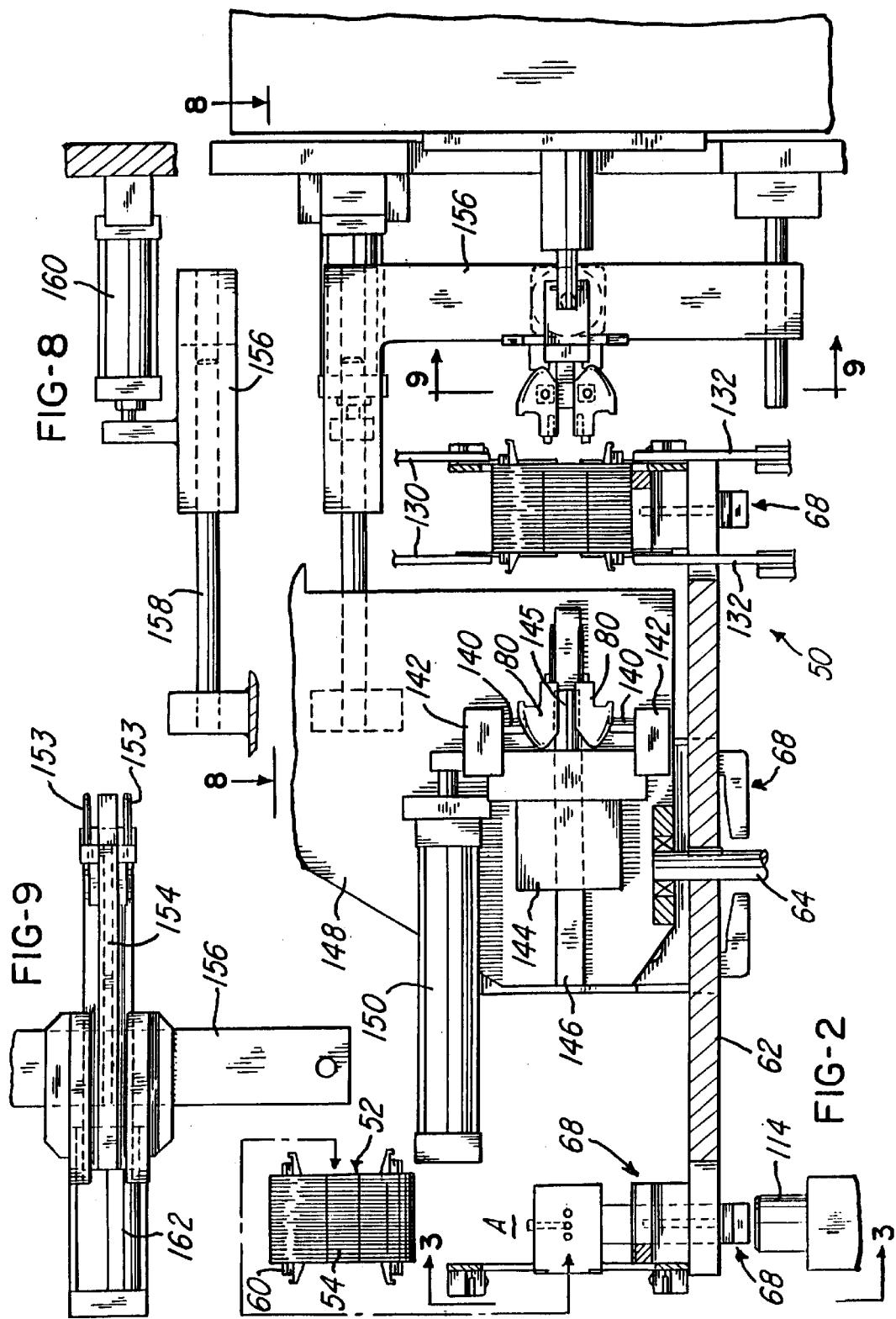

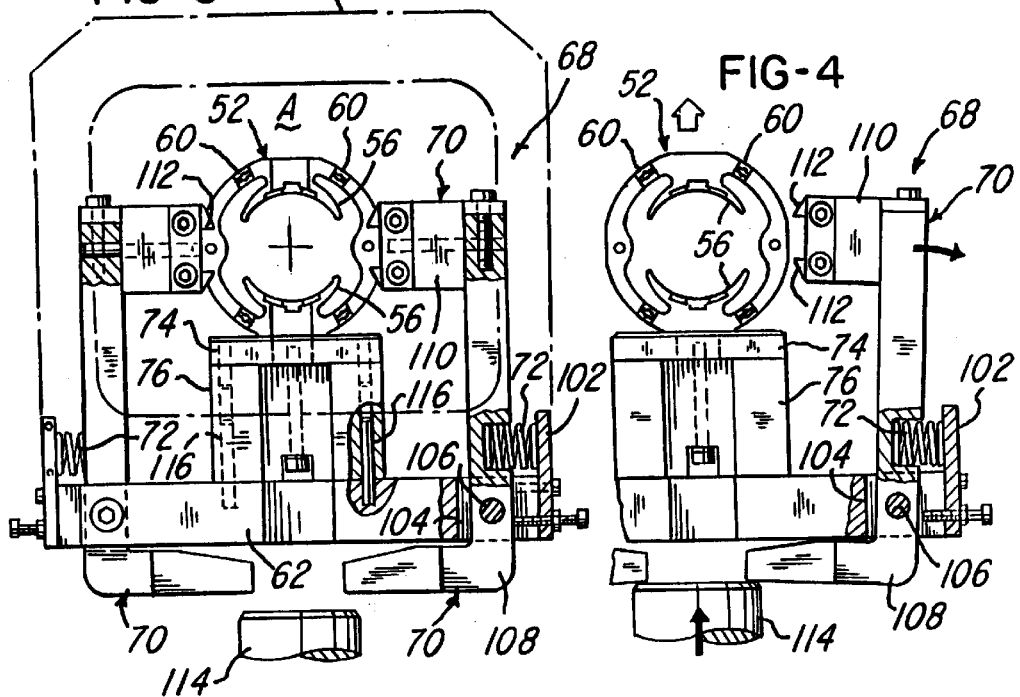

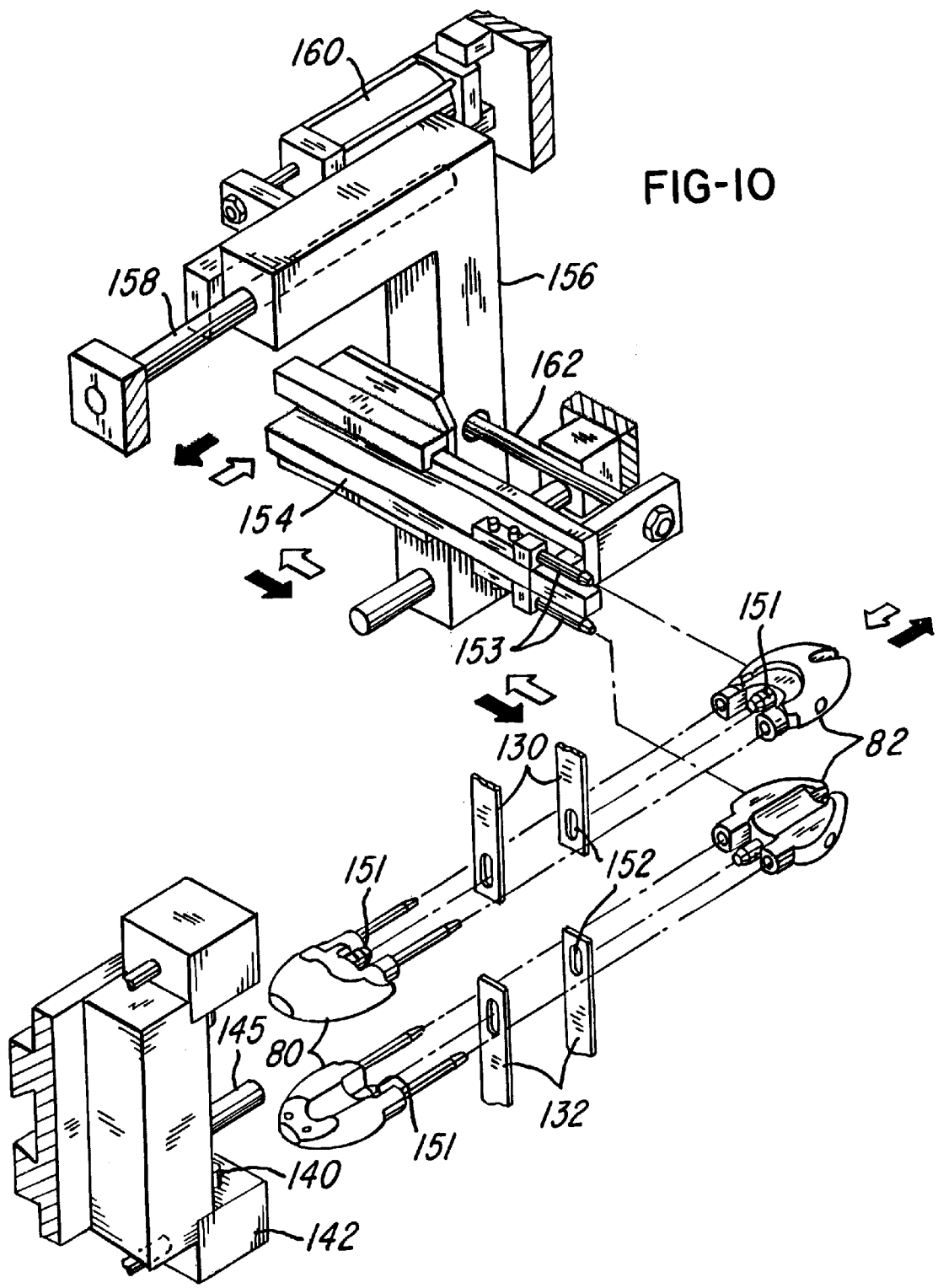

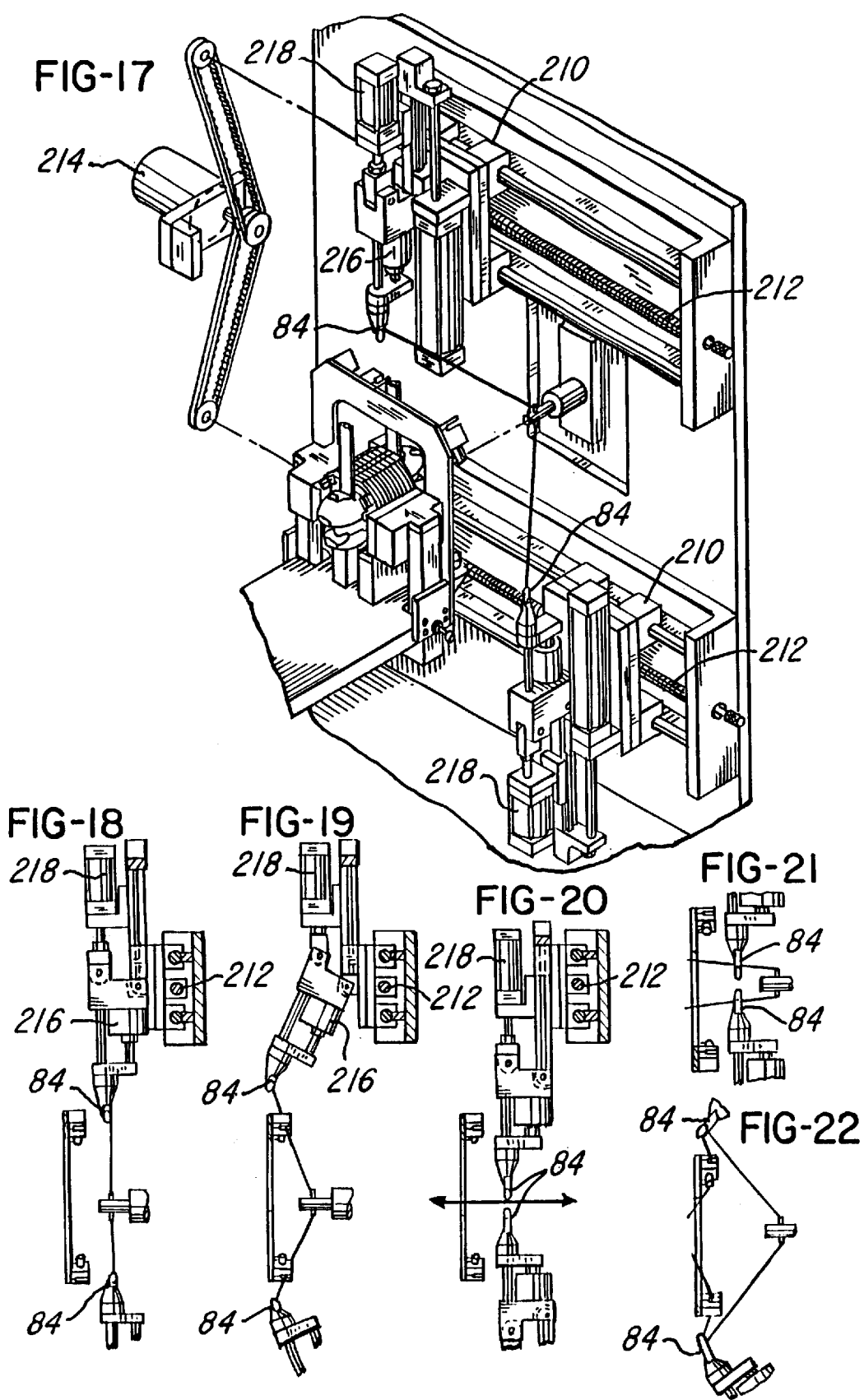

STATOR WINDING METHOD AND APPARATUS

CROSS-REFERENCE TO RELATED APPLICATIONS

This application is continuation of application Ser. No. 08/349,410, filed Dec. 5, 1994, U.S. Pat. No. 5,549,253 which is a divisional of application Ser. No. 08/148,175, filed on Nov. 5, 1993. now U.S. Pat. No. 5,370,324 which was a continuation of application Ser. No. 07/587,937, filed Sep. 25, 1990, now abandoned.

BACKGROUND OF THE INVENTION

This invention relates to a stator winding apparatus and particularly to a machine for winding field coils on dynamoelectric devices and particularly 2-pole stators and for effecting a connection between the field coils and terminals mounted on the stator.

An object of this invention is to provide a machine which has a high production rate, which is readily adaptable for use with industrial robots and conveyors that convey stators to and from the machine, and is readily changed over, by the use of both programmably adjustable parts and readily replaceable parts, from the winding of a stator of one configuration to the winding of stators having different configurations.

In accordance with this invention, a stator winding machine is provided having a turret plate mounted for rotation about a vertical axis extending centrally therethrough, and plural stator clamp mechanisms mounted at spaced locations around the periphery of the turret plate, each of which mechanisms clamps a stator to the turret plate. For reasons which will become apparent, each stator is clamped to the turret plate with its center axis extending horizontally and substantially perpendicularly with respect to the vertical axis of rotation of the turret plate and with the end face of the stator most remote from the vertical axis of the turret plate held in a vertical orientation spaced a fixed horizontal distance from such vertical axis. The stator is positioned on a seat adjacent each of the clamp mechanisms which may include a replaceable spacer for positioning the clamped stators at a proper height.

A wire clamp assembly is mounted on the turret plate adjacent each of the stator clamp mechanisms. Each wire clamp assembly preferably has programmable, air operated wire clamps adapted to temporarily hold coil lead wires extending from coils wound on a stator being wound.

The turret plate is repeatedly indexed in one direction about its vertical center axis to repeatedly sequentially move each of the stator clamp mechanisms to a load/unload station, a winding station, a coil lead terminating station, and then back to the load/unload station. In the presently preferred embodiment, the turret has four stator clamp mechanisms, located 90 degrees apart around the periphery of the turret plate, one for each of the above-mentioned stations and an additional one which is accommodated by an idle station between the load/unload stations and the winding station.

At the load/unload station, a newly wound stator is removed from the turret plate and replaced by an unwound stator. Subsequently, the unwound stator is moved by an index of the turret plate to the winding station. Located adjacent the winding station is a winding head having a winding shuttle or ram that reciprocates and oscillates about a fixed horizontal axis to draw two or more wires from sources of wire under tension to wind the wires into coils about the stator poles. In advance of the operation of the winding head, two pairs of winding forms are connected to the unwound stator at the winding station, and a pair of wires extending from the wire sources and held by wire grippers are inserted by movement of the wire gripers into a pair of the wire clamps supported on the turret plate. Coils of wire are then wound on the unwound stator by operation of the winding head. At the conclusion of the winding operation, the wire portions leading from the coils to the winding shuttle are gripped by the wire grippers to form coil finish lead wires extending from the coils, which are positioned in other wire clamps on the turret plate. Wire cutting mechanisms associated with the wire grippers cut the finish leads, now clamped to the turret plate, free from wire grippers so that the newly wound stator is completely severed from the winding head. The stator may then be indexed by rotation of the turret plate to the wire terminating station at which the start and finish leads are removed from the wire clamps and at least temporarily connected to terminals on the station by a robot or other suitable mechanism. Accordingly, when the newly wound stator arrives at the load/unload station, it may be simply unclamped from the turret plate and removed. The foregoing operations are repeated to continuously wind stators.

Preferably in accordance with this invention, the stator clamp mechanisms and the stator seats and spaces are quickly replaceable to accommodate stators having different stack diameters, the wire grippers form parts of a winding form handling and locking mechanism are capable of accommodating stators having different stack heights, the winding head is programmably movable for accommodating stators having different stack heights, and the wire grippers for part of a lead pull assembly which is programmable to accommodate different requirements for stator coil leads, both as to the position of the wire clamps for the start and finish wires and also as to any clamps that may be provided for coil tap leads.

Other objects and advantages will become apparent from the following description and the drawings.

BRIEF DESCRIPTION OF THE DRAWINGS

FIG. 2 is a simplified, fragmentary, front elevational view of the machine of FIG. 1 and showing an unwound stator in position to have coils wound therein and another unwound stator about to be clamped to the machine turret plate.

FIG. 3 is a fragmentary elevational view, with parts broken away and parts shown in cross section, of a stator support and clamp assembly forming part of the machine of FIG. 1 as viewed in the direction of arrows 3—3 of FIG. 2 and showing a wire clamp support holder associated therewith by broken lines.

FIG. 4 is a fragmentary elevational view, with parts broken away and parts shown in cross section, of a portion of the stator support and clamp assembly of FIG. 3.

FIG. 5 is a fragmentary, exploded perspective view of a portion of a stator support forming part of the support and clamp assembly of FIGS. 3 and 4.

FIG. 6 is a fragmentary, exploded perspective view of a portion of a stator clamp forming part of the support and clamp assembly of FIGS. 3 and 4.

FIG. 7 is a view similar to FIG. 3 showing the stator support and clamp assembly modified to support a stator of a different size.

FIG. 8 is a fragmentary top plan view, partly in cross-section, of a portion of a winding form-loading mechanism of the machine of FIGS. 1 and 2 as viewed in the direction of arrows 8—8 of FIG. 2.

FIG. 9 is a fragmentary elevational view of another portion of the winding form-loading mechanism of the machine of FIGS. 1 and 2 as viewed in the direction of arrows 9—9 of FIG. 2.

FIG. 10 is a simplified, fragmentary, exploded, perspective view that diagrammatically illustrates the movements of the various parts of the winding form-loading mechanism. The stator is not shown in FIG. 10 to avoid a confusion of lines.

FIG. 17 is a fragmentary perspective view of a programmably adjustable lead pull assembly forming part of the machine of FIGS. 1 and 2. A small portion of this assembly is shown diagrammatically in FIG. 1 and is not shown in FIG. 2 to avoid overcrowding of lines.

FIGS. 18 through 22 diagrammatically illustrate the initial and final steps in the sequence of operation of the programmably adjustable lead pull assembly of FIG. 17.

DETAILED DESCRIPTION

Figure 1:
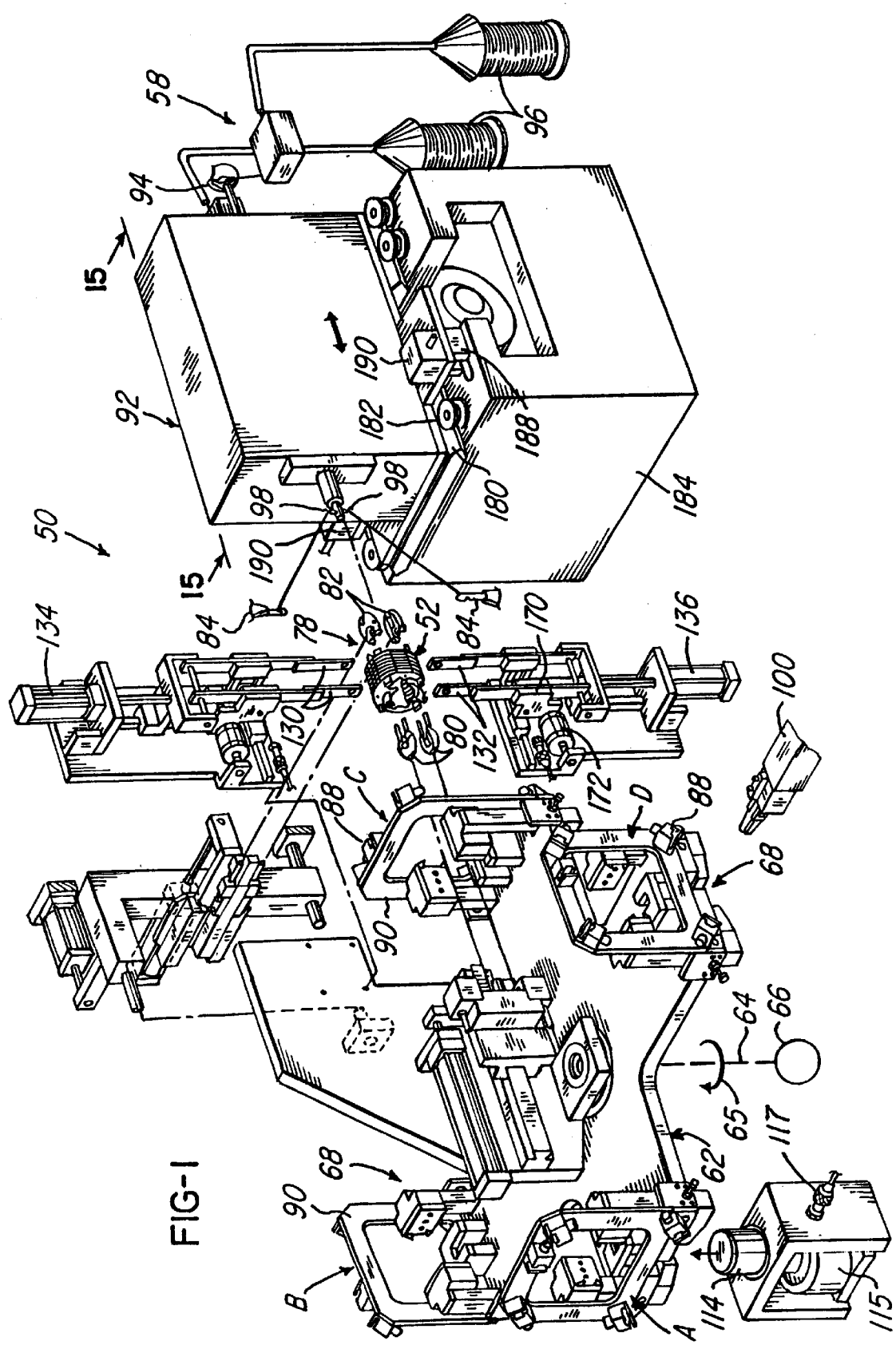
FIG. 1 is a simplified, exploded, partly diagrammatic perspective view of a stator winding machine in accordance with this invention.

FIGS. 1 and 2 illustrate a stator winding machine, generally designated 50, in accordance with this invention for use in winding coils of wire onto a 2-pole stator, generally designated 52, comprising a generally cylindrical laminated core 54 that forms pole pieces 56 about which the coils are wound from wires drawn from sources 58 of wire under tension. Here it may be observed that the length of a stator is known as its "stack height" since its length is determined by the number and thickness of the laminations from which it is formed. Its outer diameter is termed its "stack diameter". The stator 52 is also provided with terminal boards, which may be entirely conventional, and terminals 60 held by the boards to which the stator coil lead wires are connected.

In general, the purpose of the stator winding machine 50 is to wind field coils onto the stator pole pieces 56 and to at least temporarily connect the coil lead wires to the terminals on the stator.

With continued reference to FIGS. 1 and 2, the machine 50 includes a turret plate 62 mounted for rotation about a vertical axis 64 and repeatedly rotationally indexed through successive 90 degree increments in one direction, as indicated by the arrow 65 in FIG. 1, about its vertical axis 64 by a suitable indexing drive motor 66. Stators to be wound are clamped to an individual one of four stator clamp mechanism, generally designated 68, each of which includes a pair of mutually confronting stator clamps, generally designated 70, pivotally mounted on the periphery of the turret plate 62 and biased by springs 72 into clamping engagement with the stators clamped thereby. The stators are supported by seats 74 located around the periphery of the turret plate 62. Spacers 76 to which the seats 74 are connected in any suitable fashion are provided, if needed, to locate the stators at the proper height with the longitudinal axis of the stator coplanar with the horizontal axis of movement of the winding shuttle, as will become apparent.

The four stator clamp mechanism 68 are connected to the turret plate 62 at 90 degree spaced locations so that, in operation, after each 90 degree index of the turret plate 62, there will be a clamp mechanism 68 at each of four stations, namely a load/unload station A, an idle stations B, a winding station C, and a coil lead terminating station D. At each of the stations, the stators are positioned with their center axes extending horizontally and substantially perpendicularly with respect to the vertical axis 64 of the turret plate 62 and with the end faces of the stators most remote from the vertical axis 64 in vertical orientations and spaced a fixed horizontal distance from the vertical axis 64 of the turret plate 62.

At the load/unload station A, a newly wound stator 52 is unclamped from the turret plate 62, removed from the turret plate 62, and replaced by an unwound stator 52. No operations are performed on the stator at the idle station B. At the winding station C, two pairs of winding forms 78, namely a pair of upper and lower front winding forms 80 and a pair of upper and lower rear winding forms 82, are connected to the unwound stator 52, and wire portions held by an upper and lower pair of wire grippers 84 are inserted by movement of the wire grippers 84 into a pair of the wire clamps 88 supported on the turret plate 62 by a mounting frame plate 90, as will be further described below.

After the foregoing steps are accomplished, a pair of stator coils are wound by the operation of a winding head 92 located adjacent the winding station C and having a reciprocating and oscillating shuttle or ram 94 that draws wires from sources 96 of wire under tension and having wire guide needles 98 through which the wires exit as the coils are wound. The operating mechanism within the winding head may be entirely conventional so it is not described in detail herein, its importance being that it causes the winding shuttle or ram 94 to reciprocate and oscillate about a fixed horizontal axis in order to wind coils of wire around the stator pole pieces in a manner well known in the art.

At the conclusion of the winding operation, the wire portions leading from the coils to the winding shuttle 94 are gripped by the wire grippers 84 to form coil finish lead wires extending from the coils, which are positioned in other ones of the wire clamps 88. Wire cutting mechanism associated with the wire grippers 84 cut the finish leads free from the wire grippers so that the newly wound stator is completely free from the winding head shuttle 94 so that it may be indexed by rotation of the turret plate 62 to the wire terminating station D at which the start and finish leads are removed from the wire clamps 88 and at least temporarily connected to terminals on the stator by a robot or other suitable mechanism, diagrammatically indicated at 100. This mechanism may also be conventional and is not further described herein. One example of a coil terminating mechanism is shown in U.S. Pat. No. 4,951,379. Thus it may be seen that when the newly wound stator returns to the load/unload station A, it may be simply unclamped from the turret plate and removed. The foregoing operations are repeated to continuously wind stators.

With reference to FIGS. 1 through 6, each clamp mounting plate 90 comprises a rectangular plate connected to a pair of spring retainer plates 102, each of which is mounted on the turret plate 62 over a recess 104 therein which is spanned by a pivot pin 106 for an L-shaped clamp lever 108 that forms part of one of the stator clamps 70. Each clamp 70 further includes a clamp jaw 110 removably connected to the clamp lever 108 shaped to engage the outer periphery of the stator. Each clamp jaw 110 has a pair of protuberant teeth 112 having vertical surfaces which provide reference points or backup surfaces engaged by the face of the stator most remote from the vertical axis 64 to insure that the stator is properly spaced from the operating mechanisms at the various stations. The stator may be so positioned by hand or by the use of a suitable mechanism, such as an industrial robot (not shown). To enable the stator to be inserted and removed through the clamp mounting plate 90 at the load/unload station A, the clamp jaws are spread apart by engagement of the piston 114 of an air cylinder 115 with the lower leg of the L-shaped clamp lever 108, as apparent from an inspection of FIGS. 1–3. A sensing switch 117 (FIG. 1) indicates to the machine controls that it is safe to index. The operations of this and various other sensing devices are not described herein, the use of such devices in the control of machine operations being well known.

As seen in FIGS. 5 and 6, the assembled seats 74 and spacers 76 and the stator clamp jaws 110 are readily removable and replaceable for use in supporting stators having different stack diameters. Thus, an assembled seat 74 and spacer 76 can simply be lifted off the turret plate 62, it being held only by a pair of pins 116 on the turret. The stator clamp jaw 110 shown in FIG. 6, being aligned with the lamp lever 108 by a pair of pins 118 projecting from the clamp jaw 110 which are received by bores 119 in the clamp lever 108, is similarly slidable off the clamp lever 108 following removal of a retaining pin 120. The advantage of these quick-change parts can be observed by a comparison of FIGS. 3 and 7. Thus, FIG. 3, shows a relatively larger stator 52 and FIG. 7 shows a relatively smaller stator, designated 52A. FIG. 7 accordingly has a correspondingly taller spacer, designated 76A, and longer clamp jaws, designated 110A. It will be noted in FIGS. 3 and 7 that the stators are located on the same center line.

The winding of an unwound stator 52 commences with placement of the stator on the seat 74 located at the load/unload station A. This places the stator in a proper rotational orientation for further processing in view of the fact that the stator has a flat surface which rests on the seat 74. Of course, other means of stator orientation could be used. After the second subsequent index of the turret plate 62, the unwound stator arrives at the winding station C with its center line aligned with the fixed axis of reciprocation and oscillation of the winding shuttle 94. At this time the winding forms 80 and 82 are locked to one another and to the stator core 54 in an essentially conventional fashion. Thus, an upper pair of form retainer blades 130 are moved downwardly and a lower pair of form retainer blades 132 are moved upwardly by the operation of air actuators 134 and 136, respectively, into straddling relation to the stator core 54. It is appropriate to note at this time that the stator seat 74 and its spacer 76 are shaped to permit the extension of the lower form retainer blades therethrough or therepast.

With reference to FIGS. 2 and 10, the front pair of winding forms 80 are initially held between short piston rods 140 controlled by air cylinders 142 mounted on a carriage 144 and a center post 145 on the carriage 144. The carriage 144 is slidably guided along a gib 146 mounted on a mounting plate 148 affixed to the bed of the machine. The carriage 144 is movable toward and away from the stator at the winding station C by operation of an air actuator 150 that is also mounted on the fixed mounting plate 148. Advancement of the carriage 144 toward the stator causes the front winding forms to engage the front face of the stator core at which time a locking pin 151 on the front winding forms 80 pass through slots 152 in the form retainer blades 130 and 132. The rear pair of winding forms 82 is then advanced toward the stator and interengages with the front winding forms 80 and 82 to the stator core 54 by engagement with the locking pins, as is well known.

The parts that carry the winding forms 80 and 82 to the stator are now moved away to enable the coil lead connection and the coil winding operations to commence. The carriage 144 for the front winding forms is simply retracted out of the way by operation of the air actuator 150. With reference to FIGS. 8, 9, and 10, the rear winding forms are carried by support pins 153 mounted on a pin carriage 154 movably mounted on an L-shaped bracket 156 slidable on guide rod 158 in a direction generally parallel to the stator axis and moved therealong by an actuator 160. The pin carriage 154 is driven relative to the bracket 156 by an air actuator 162 thereon. In operation, the support pins 153 are advanced to bring the rear winding forms toward the stator by operations of the air actuator 160. After the forms are locked to the stator, the pin carriage is retracted to the side by operation of the air actuator 162 and then rearwardly by operation of the air actuator 160 where the parts are out of the way to permit the coil lead handling and winding operations to take place. The operations to remove the winding forms 80 and 82 after the winding operation is completed will be obvious from the foregoing.

Figure 11:
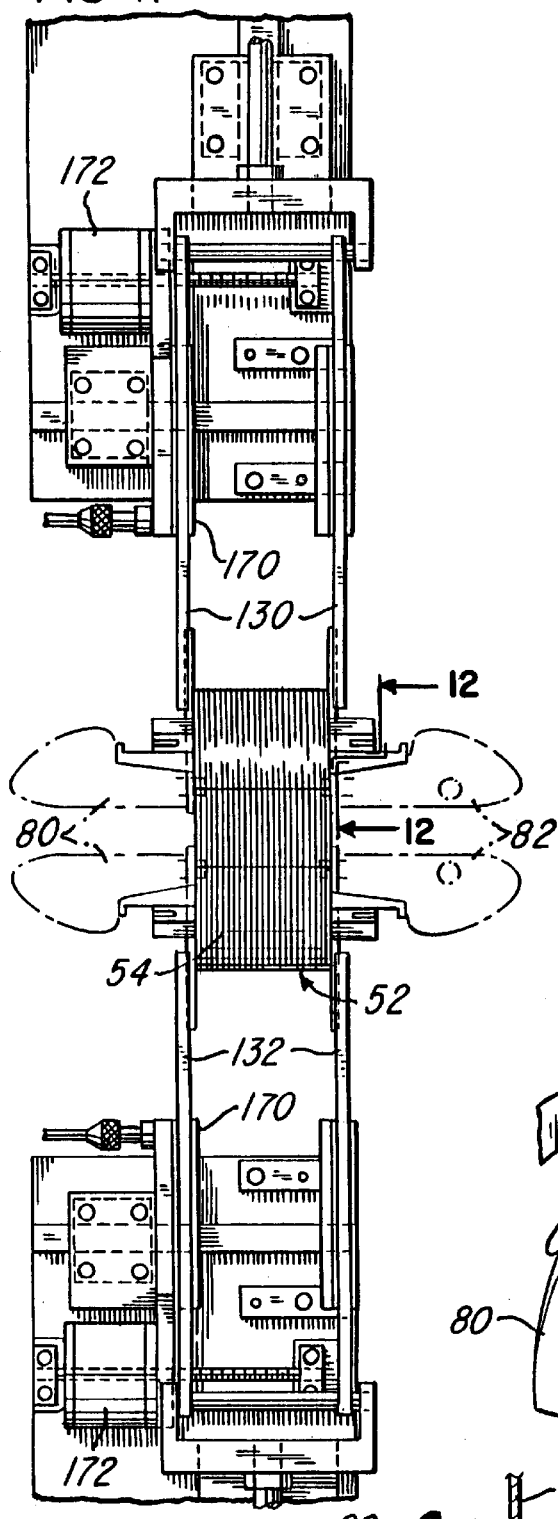
FIG. 11 is a fragmentary, elevational view of a stator located in position to be wound and showing winding forms locked to the stator by upper and lower programmably adjustable form lock assemblies in accordance with this invention.
Figure 14:
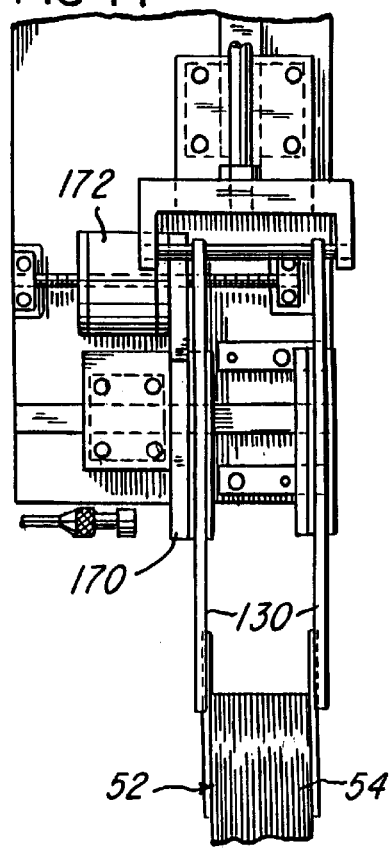
FIG. 14 is a simplified, fragmentary, elevational view showing the upper form locking assembly adjusted for use with a stator having a different stack height.
Figure 12:
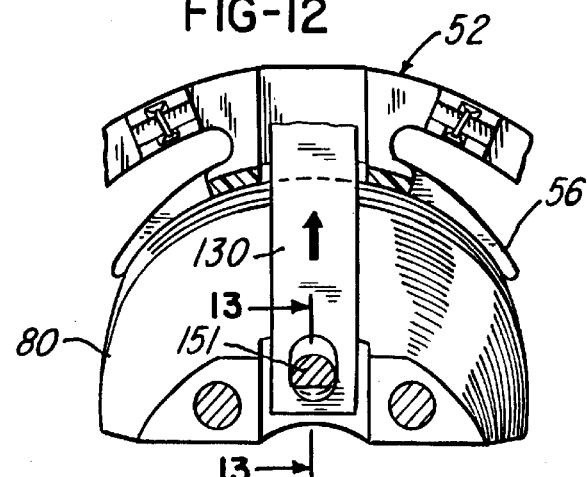
FIG. 12 is an enlarged, fragmentary cross sectional view taken along section line 12—12 of FIG. 11, with parts cut away, showing the manner in which a winding form is locked to a stator.
Figure 13:
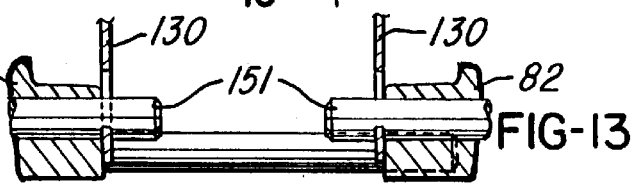
FIG. 13 is a fragmentary cross sectional view taken along section line 13—13 of FIG. 12 and on the same scale as FIG. 12.

With reference to FIGS. 1, 11, and 14, further in accordance with this invention, the frontmost ones of the upper and lower form locking blades 130 and 132 are mounted on movable carriages 170 driven by motors 172 that enable them to be programmably adjusted for use with stators having different stack heights. Of course, the positions of the rear locking blades are fixed because the corresponding face of the stator is always located in the same vertical plane regardless of the stator stack height.

Figure 15:
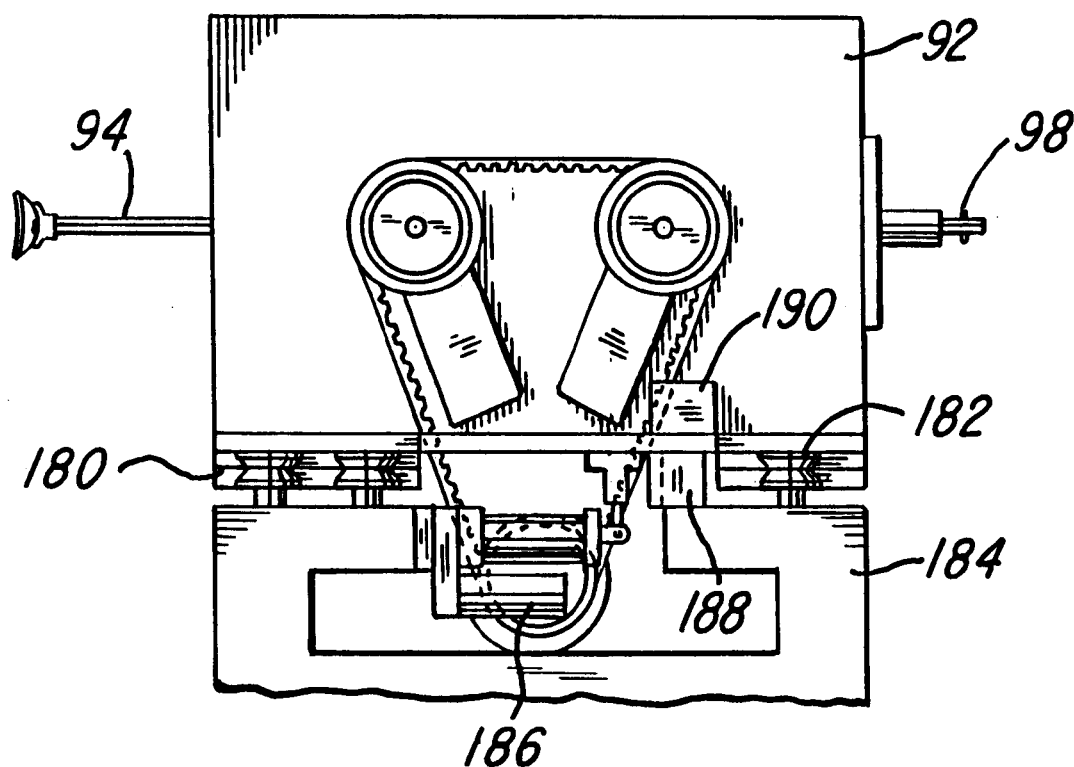
FIG. 15 is a fragmentary, rear elevation view of the programmably adjustable winding head assembly of this invention, representing the portion of the machine viewed in the direction of arrows 15—15 of FIG. 1.
Figure 16:
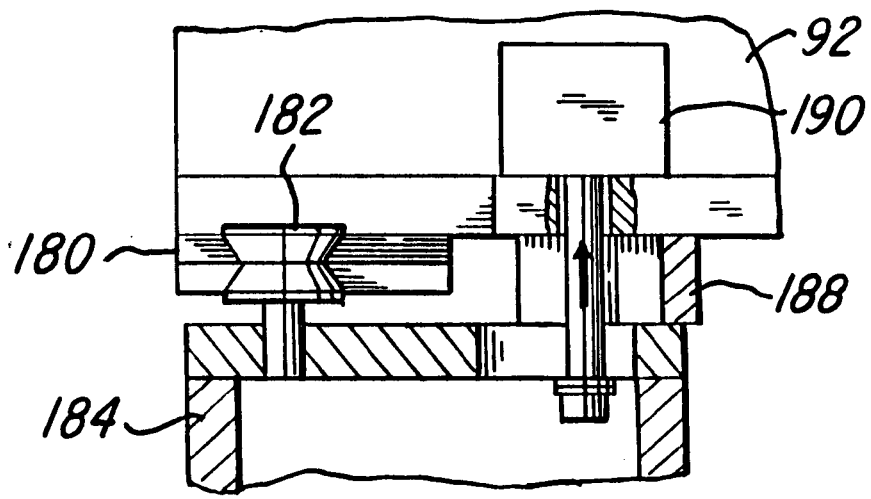
FIG. 16 is an enlarged, fragmentary elevational view showing the manner in which a winding head is clamped to its base.

With reference to FIGS. 1, 15, and 16, also for purposes of adjusting to stators having different stack heights, the winding head 92 has tracks 180 supported by roller elements 182 on a winding machine base 184. The entire winding head 92 may be moved toward and away from the stator, to advantageously adjust the center of the shuttle reciprocation to the center of the stator by means of a suitable drive unit 186. During the movement of the winding head 92, it also slides along a brass clutch member 188 shown in FIG. 16. To clamp the winding head in an adjusted location, a pair of air operated clamps 190 draw the winding head 92 and its base 184 together. The operating parts for moving and clamping the winding head 92 may also be programmably controlled for purposes of quick change over.

FIGS. 17 through 22 illustrate how the wire grippers 84 may be programmably controlled for winding stators having various different lead positioning requirements. There it will be noted that the wire grippers 84 are mounted on movable carriages 210 that are driven by screws 212 rotated by a motor 214 by which carriages 210 are moved in opposite directions along the screws 212. Air actuators 216 and 218 on the carriages 210 are used to control the various movements of the lead pulls as illustrated in FIGS. 18 through 21. As known, cutting blades (not shown) mounted on the wire grippers 84 are used to sever the wire segments between the lead wire grippers 84 and the wound stator at the completion of the winding operation.

Although the presently preferred embodiments of this invention have been described, it will be understood that within the purview of the invention various changes may be made within the scope of the following claims.

Having thus described our invention, we claim:

1. Stator processing apparatus comprising:
   a table member mounted for rotation in a substantially horizontal plane about a substantially vertical axis;
   a plurality of stator holders mounted on said table member, said stator holders being angularly spaced from one another about said substantially vertical axis, each of said stator holders including first and second jaw members movable relative to one another so that a stator can be releasably held between said jaw members; and
   first, second, and third work stations disposed adjacent to said table, said work stations being angularly spaced from one another about said substantially vertical axis so that by rotation of said table about said substantially vertical axis, each of said stator holders can be successively disposed adjacent said first, second, and third work stations, said first work station including means for placing a stator in a stator holder disposed adjacent said first work station, said second work station including means for winding at least one coil of wire having at least one coil lead on a stator in a stator holder disposed adjacent said second work station, and said third work station including means for anchoring to a stator in a stator holder disposed adjacent said third work station the coil lead of the coil wound on that stator.

2. The apparatus defined in claim 1 wherein each stator has a longitudinal axis, and wherein each stator holder holds a stator with its longitudinal axis substantially horizontal when said stator holder is adjacent said second work station.

3. The apparatus defined in claim 2 wherein each stator holder holds a stator with its longitudinal axis at least approximately intercepting said substantially vertical axis when said stator holder is adjacent said second work station.

4. The apparatus defined in claim 1 wherein said means for placing includes means for removing a stator from a stator holder disposed adjacent said first work station prior to operation of said means for placing to place a stator in that stator holder.

5. The apparatus defined in claim 1 wherein each of said stator holders comprises:
   means for resiliently urging said first and second jaw members toward one another in order to hold a stator.

6. The apparatus defined in claim 5 wherein said apparatus further comprises:
   means disposed adjacent said first work station for selectively moving said first and second jaw members of a stator holder disposed adjacent said first work station away from one another by overriding the operation of said means for resiliently urging in order to release a stator.

7. The apparatus defined in claim 6 wherein each of said stator holders comprises:
   a jaw support structure on which said first and second jaw members are mounted.

8. The apparatus defined in claim 1 further comprising:
   means for producing relative motion between said second work station and a stator holder disposed adjacent said second work station, said relative motion being parallel to a substantially horizontal axis which passes through that stator holder and at least approximately intercepts said substantially vertical axis.

9. The apparatus defined in claim 1 further comprising:
   at least one roller for producing relative motion between said second work station and a stator holder disposed adjacent said second work station, said relative motion being parallel to a substantially horizontal axis which passes through that stator holder and at least approximately intercepts said substantially vertical axis.

10. The apparatus defined in claim 1 wherein each of said stator holders comprises:
    a jaw support structure on which said first and second jaw members are removably mounted.

11. A machine for winding a plurality of stators each having an associated longitudinal axis, stack diameter and stack height, said machine comprising:
    a table mounted for rotation about a first substantially vertical axis;
    first, second, and third stations spaced from one another around said table, wherein said first station is a winding station having one or more winding needles;
    means for selectively rotating said table about said first axis so that said table moves relative to said first, second, and third stations;
    a plurality of stator supports spaced around the periphery of said table, each stator support being adapted to receive and hold a stator and having a pair of opposing clamping members for releasably clamping said stator thereto; and
    means for providing relative radial motion between said winding station and a first stator support rotated into position adjacent said winding station so as to position said one or more winding needles adjacent said first stator support.

12. The machine defined in claim 11 wherein said pair of opposing clamping members are adapted to be replaced so that said machine is adapted to accommodate a plurality of stators having different stack diameters.

13. The machine defined in claim 11 wherein said stator supports include a spring for biasing at least one of said clamping members towards said stator for releasably clamping the stator.

14. The machine defined in claim 11 wherein said stator supports hold said stators so that they are wound with their axes substantially horizontal.

15. The machine defined in claim 11 wherein said pair of opposing clamping members can accommodate a stator having a first stator diameter and wherein said pair of opposing clamping members can be removed from said machine and replaced with another pair of opposing clamping members that can accommodate a stator having a second stator diameter different from said first stator diameter.

16. The machine defined in claim 11 having four stator supports equally spaced around the periphery of said table.

17. The machine defined in claim 11 wherein said stator supports can accommodate a plurality of stators having different stack heights without adjusting said stator supports.

18. The machine defined in claim 11 wherein said means for providing relative radial motion comprises means for moving a winding head radially relative to said first substantially vertical axis.

19. A method for winding a plurality of stators, each having an associated longitudinal axis, stack diameter, and stack height, said method comprising the steps of:

providing a table mounted for rotation about a first substantially vertical axis;

providing a first station and a second station spaced from one another around said table, wherein said first station is a stator loading and unloading station and wherein said second station is a stator winding station having one or more winding needles;

providing a plurality of stator supports spaced around the periphery of said table, each stator support being adapted to receive and hold a stator at said first station and to hold the stator so that it is wound at the winding station with its longitudinal axis oriented substantially horizontal;

releasably clamping a first stator at the loading and unloading station with a first pair of removable opposing clamping members, said first stator having a first diameter;

rotating said table so as to position said first stator adjacent said winding station;

providing relative motion between said rotated first stator and said winding station so as to position said one or more winding needles adjacent said first stator;

winding said first stator with at least one coil of wire; and rotating said table so as to return said wound stator to the load and unload station.

20. The method of claim 19 further comprising the steps of:

unloading said first stator from said first pair of removable opposing clamping members;

removing said first pair of removably opposing clamping members from said stator support; and replacing said first pair of removable opposing clamping members with a second pair of removable opposing clamping members so as to be able to releasably clamp a second stator at the loading and unloading station, said second stator having a second diameter different from said first diameter.

21. The method defined in claim 20 wherein the first and second stators have different stack heights and wherein substantially no adjustment to said stator supports has to be made in order to accommodate such different stack heights.

22. The method defined in claim 19 wherein said step of releasably clamping said first stator with a first pair of removable clamping members includes the step of biasing at least one of said clamping members towards said first stator for releasably clamping the stator.

23. The method defined in claim 19 wherein said step of providing a plurality of stator supports includes the step of providing four stator supports equally spaced around the periphery of said table.

24. A machine for winding a plurality of stators, said machine comprising:

a table mounted for rotation about a first substantially vertical axis:

first second, and third stations spaced from one another around said table, wherein said first station comprises a load and unload station;

means for selectively rotating said table about said first axis so that said table moves relative to said first, second and third stations;

a plurality of stator supports spaced around the periphery of said table, each stator support being adapted to receive and hold a stator and having a pair of opposing clamping members for releasably clamping said stator thereto, said clamping members being able to be moved between an unlocked position and a locked position wherein said stator is clamped; and a stationary actuator located adjacent said load and unload station for moving said clamping members between the unlocked position and locked position so as to allow a stator to be loaded and unloaded from said machine when said clamping members are in the unlocked position.

25. The machine defined in claim 24 wherein said stationary actuator is attached to a stationary base of said machine.

26. The machine defined in claim 25 wherein said stationary actuator provides an actuation force in a substantially vertical direction for moving said clamping members between the locked position and unlocked position.

27. The machine defined in claim 25 having four stator supports equally spaced around the periphery of said table.

28. The machine defined in claim 24 wherein said stator supports include a spring for biasing at least one of said clamping members towards said stator for releasably clamping the stator.

29. The machine defined in claim 24 wherein said stationary actuator comprises an air actuator.

30. A method for winding a plurality of stators, each having an associated longitudinal axis, said method comprising the steps of:

providing a table mounted for rotation about a first substantially vertical axis;

providing a first station and a second station spaced from one another around said table, wherein said first station is a stator loading and unloading station and wherein said second station is a stator winding station;

providing a plurality of stator supports spaced around the periphery of said table, each stator support being adapted to receive and hold a stator at said first station and to hold the stator so that it is wound at the winding station with its longitudinal axis oriented substantially horizontal, said plurality of stator supports each including a pair of opposing clamping members for releasably clamping said stators, and said clamping members being able to be moved between an unlocked position and a locked position wherein said stators are clamped;

providing a stationary actuator adjacent said stator load and unload station for moving said clamping members between the unlocked position and locked position so as to allow a stator to be loaded and unloaded from said machine when said clamping members are in the unlocked position;

loading a first stator in a first stator support by actuating said stationary actuator;

rotating said table so that a second stator support is positioned adjacent said stator loading an unloading station;

loading a second stator in said second stator support by actuating said stationary actuator before said first stator is unloaded from said first stator support;

winding said first stator with at least one coil of wire at the winding station;

rotating said table so as to return said wound stator to the stator load and unload station; and unloading the first stator from the first stator support by actuating said stationary actuator.

31. The method defined in claim 30 further comprising the step of providing a third station spaced from said first station and a second station around said table, wherein said third station is a termination station.

32. The method defined in claim 30 wherein said step of loading said first stator in a first stator support includes the step of releasably clamping said first stator with a pair of opposing clamping members.

33. The method defined in claim 30 wherein said step of providing a plurality of stator supports includes the step of providing four stator supports equally spaced around the periphery of said table.

* * * * *